United States Patent [19]

Krumhansl

[11] 4,353,412

[45] Oct. 12, 1982

[54] HEATING AND COOLING SYSTEM

[76] Inventor: Mark U. Krumhansl, 1811 Bent Twig, Tustin, Calif. 92680

[21] Appl. No.: 122,117

[22] Filed: Feb. 19, 1980

[51] Int. Cl.³ .............................................. F24F 13/02
[52] U.S. Cl. ..................................... 165/59; 98/33 R; 165/16; 165/28; 165/29; 165/48 S
[58] Field of Search ............. 98/33 R, 33 A; 126/415, 126/426, 428, 437, 452; 137/625.43, 625.46, 887; 165/2, 16, 28, 29, 39, 59, 48 S, 10, 27, 48 R, 137; 237/2 B; 62/235.1

[56] References Cited

U.S. PATENT DOCUMENTS

| | | | |
|---|---|---|---|
| 3,747,671 | 7/1973 | Schwitzer | 98/33 R X |
| 3,991,742 | 11/1976 | Gerber | 126/426 |
| 3,995,446 | 12/1976 | Eubank | 137/625.46 X |
| 4,007,776 | 2/1977 | Alkasab | 126/437 X |
| 4,060,195 | 11/1977 | Rapp et al. | 165/39 X |
| 4,062,400 | 12/1977 | Horowitz | 165/16 X |
| 4,111,259 | 9/1978 | Lebduska | 126/428 X |
| 4,143,814 | 3/1979 | Hill | 126/437 X |
| 4,209,996 | 7/1980 | Shaw | 237/2 B X |
| 4,228,786 | 10/1980 | Frankenfield | 126/400 X |
| 4,242,872 | 1/1981 | Shaw | 237/2 B X |

*Primary Examiner*—Gerald A. Michalsky
*Attorney, Agent, or Firm*—Grover A. Frater

[57] ABSTRACT

Heating and cooling of dwelling houses and other confined spaces is facilitated by a system in which thermal energy is transported between an air heating and cooling system in the dwelling and a water heat storage sink or source, preferably in the form of a swimming pool or swimming pool and spa combination. Special reversing valve circuitry and the use of solar collectors and liquid-to-liquid heat exchangers on the liquid side of the system, and special air valves and air modules on the air side of the system, enhance the system's efficiency and make it practical in the sense that systems employing the invention can utilize existing craft skills and building financing arrangements and building codes, and the like, without major modification.

9 Claims, 16 Drawing Figures

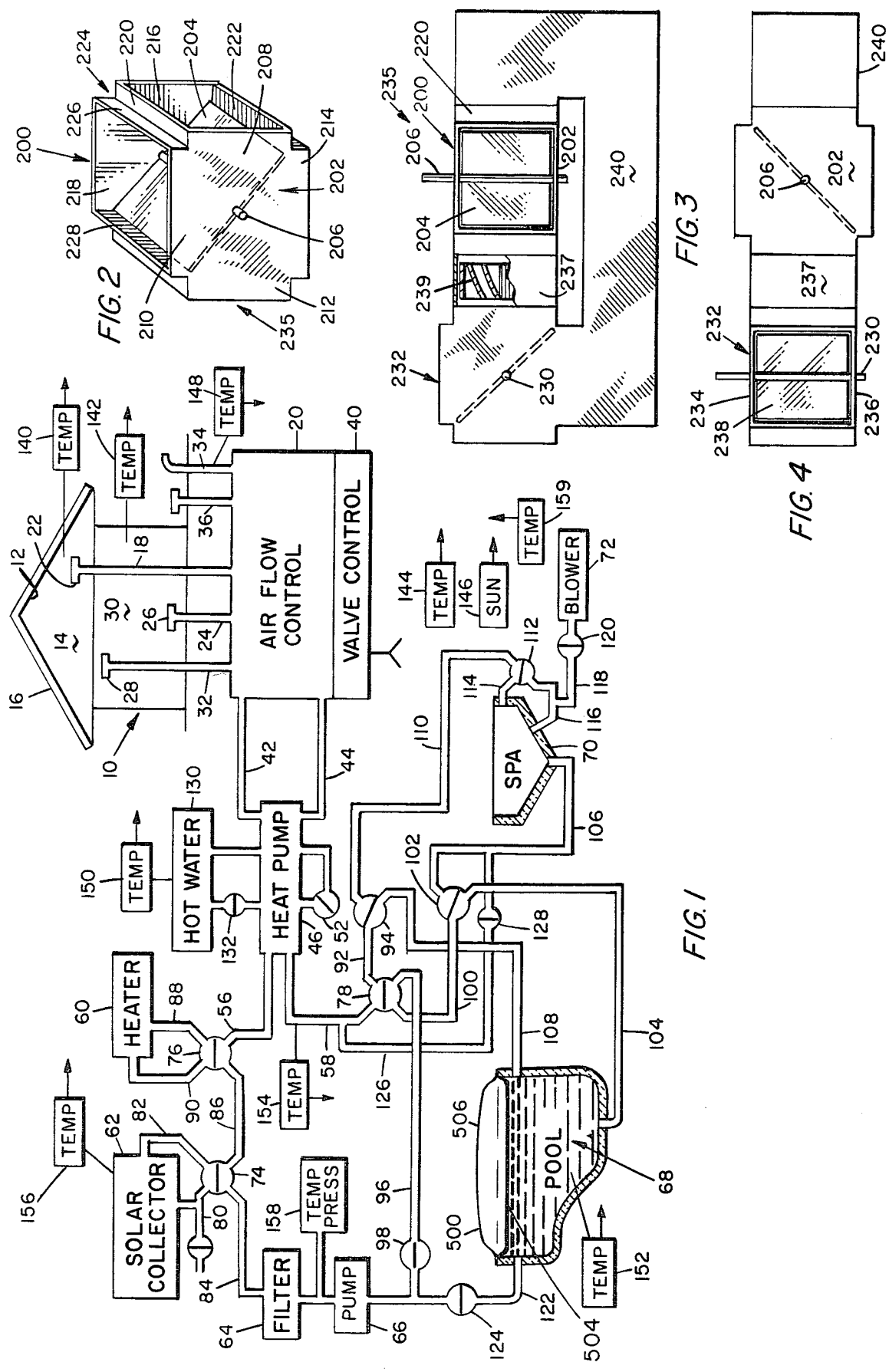

HEATING AND COOLING SYSTEM

This invention relates to methods and means for accomplishing space heating and cooling.

BACKGROUND OF THE INVENTION

The need to conserve energy and to use it more efficiently has led to a wide variety of new devices and systems and methods for accomplishing those tasks. Space heating, and particularly the heating of dwellings and buildings, has been the object of many of these energy conservation efforts. Very efficient insulation materials, efficient heat and cold storage eutectics, efficient solar energy collectors, and much other apparatus, is available along with the technology for utilizing them. However, the transition from past practices to an energy efficient world requires more than availability of better apparatus and technology. Any transition that obsoletes current craft skills and current building materials and current manufacturing techniques and facilities, and that obsoletes current building codes; any transition that requires new skills, new codes, new factories, new lending institution attitudes and statistical data, and new owner attitudes, and more investment, may be a long time in transition.

A practical solution to change from past practice to energy efficient home and building heating and cooling must have minimum impact on the workers, material producers, financiers, and others, in the building industry. It is the purpose of this invention to provide apparatus and methods which will provide such a practical solution.

SUMMARY OF THE DISCLOSURE

The invention is concerned with heating and cooling and with the development, storage and utilization of energy for that purpose. It takes into account that energy is available from different sources and that the most readily available, inexpensive source is solar energy. It takes into account the fact that availability of energy may not coincide, in time, with the need for energy by providing for the storage of heat and cold.

It is an object of the invention to provide methods and means for heating and cooling dwellings and other buildings in a way that conserves energy, has minimum adverse economic impact on the building industry and building owners, is readily adjustable to a wide variety of climactic conditions and physical surroundings, and that can result in an installation having high reliability and long trouble-free life. While not required, it is another object to provide a heating and cooling system and method that can take advantage of computer technology, currently microprocessor technology, that permits easy solution of algorithms for conserving energy and optimizing its use.

One of the central features of the invention is the provision of an air flow direction reversing or bypass air diverter valve and the use of one or more of such valves for controlling movement of air to and from spaces within a building and the ambient outdoors and a heat pump. A heat pump is used to transfer heat and cold between a sink or source for the storage of heat, or cold, or a heat source, to the building.

The preferred heat sink or source is a body of water. A swimming pool is especially useful. It provides a secondary function as a solar collector. In preferred form, and especially in freezing weather climates, the pool is arranged to continue to serve as a solar energy collector. Also in the preferred form of the invention, the building roof, and the attic air, is used as a solar collector.

The heat pump serves to divide the complete system into two segments. At one side is the apparatus relating to the collection and storage of energy for use at another time. At the other side is the building or space whose temperature is to be controlled and those sources of heat and cold whose heat and cold are to be used currently.

Such an arrangement permits the use of a water source heat pump. The heat pump transfers heat to and from water on one side, and transfers heat to and from air on the other side. At the water side, the system includes at least a heat sink or source and it may include a commercial fuel or electric water heater and solar water heater. The preferred form employs a large body of water as a heat sink or source. A swimming pool is an excellent sink or source. Private pools usually contain seven thousand to thirty thousand or more gallons of water. Large quantities of heat can be stored and removed with little change in average temperature. They are deep enough so that there is insulation and significant temperature stratification, and that feature is used to increase the efficiency of heat transfer. The pool and water source heat pump are plumbed to permit flow from the upper part of the pool with return to the bottom of the pool or for reversed flow at will.

In preferred form, air flow within the building is reversible so that warm air may be introduced at a low level to a confined space and removed at a high level, and so that flow may be reversed when cooling. A transparent covering spaced from the dark roof of the building provides a "green house" effect to heat air in the attic space to be used in heating the remainder of the building or in transferring heat to the pool for later use. A pool cover which provides a similar "green house" effect is used when the pool is not to be used for swimming in order to convert the pool to an effective winter solar heat collector and storage tank. The cover is formed by a lower, dark-colored layer which rests on the surface of the pool water and an upper transparent layer. The space between layers is inflated.

Further, the preferred form of the invention includes a means for transferring heat to and from the ambient exterior atmosphere. For those installations at which exterior air at different temperatures is available, the system includes a means for reversing and bypassing air flow to and from, and excluding air flow through, the places at which air temperatures differ.

THE DRAWINGS

In the drawings:

FIG. 1 is a schematic diagram of a preferred system in which the invention is embodied and with which the methods of the invention may be practiced;

FIG. 2 is an isometric view of an air reversing valve according to the invention;

FIG. 3 is a view in side elevation of a dual valve module of the kind employed in the invention and in which the blower section is shown partly fragmented and partly in cross-section;

FIG. 4 is a top plan view of the air diverter valve module shown in FIG. 3;

DESCRIPTION OF PREFERRED EMBODIMENT

Figure 14:
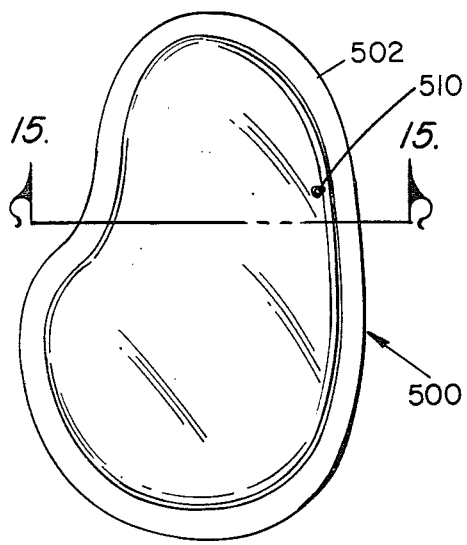
FIG. 14 is a top view of a pool cover according to the invention.

In FIG. 1 the building 10 represents a dwelling below whose roof 12 there is an attic space 14. The roof 12 is formed of a dark material and it is covered, at least in part, by a transparent covering 16 which is held spaced from the roof proper by any convenient means so that there is an air space between. An air flow conduit 18 extends from an air flow control unit 20 to flow opening 22 in the attic space. Another duct 24 interconnects the air flow control unit with a flow opening 26 in the room or other confined space within the building below the attic space. Opening 26 is located near the floor. Another flow opening 28 is located near the ceiling of the room. The room is designated 30. Conduit 32 extends from opening 28 to the air flow control unit 20. Two more air flow conduits, 34 and 36, respectively, extend from the air flow control unit 20 to different points where temperature can be expected to be different one from the other and from the indoor temperature and the attic air temperature. For example, one may lead to an underground conduit and another directly to the outside air.

The air flow control unit 20 consists of one or more air flow control valves and blower fans which are like, or are equivalent to, the units shown in FIGS. 2, 3 and 4. Those units are interconnected with the several air flow ducts 18, 24, 32, 34 and 36, in the fashion shown in FIG. 13, or in modified form, in the fashion in any of the FIGS. 5 through 13. The valves and valve modules shown in FIGS. 2, 3 and 4 are operated by valve actuators under the control of the valve control unit 40 of FIG. 1. That unit also controls the valves and the other elements of the remainder of the system shown in FIG. 1.

The air flow control unit 20 is connected by a pair of air flow conduits 42 and 44, respectively, to a water source heat pump 46. The other side of the heat pump delivers heat to or removes heat from liquid which is conducted to and from the heat pump by liquid lines 56 and 58. By reversal of the valve 52, the heat pump can be made to change the direction in which heat is transferred.

Lines 56 and 58 connect to a system which, in this embodiment, includes a heater 60, a solar collector or water heater 62, a liquid filter 64, a liquid pump 66, an insulated swimming pool 68, a spa 70, and a blower 72 whose function is to introduce air to a stream of water that is directed into the spa. The system includes a number of four-port valves identified by the reference numerals 74, 76 and 78, respectively. The input line 80 and the output line 82 of the solar collector are connected to two of the ports of valve 74. A third port is connected by line 84 to the filter 64. The fourth port is connected by a line 86 to one of the ports of the valve 76. The second and third ports of valve 76 are connected by input line 88 and output line 90 to the heater 60. The other port of valve 76 is connected to line 56. Each of valves 74 and 76 includes a diverter. In the valve 76, the diverter is positioned so that the heater 60 is bypassed. Flow proceeds directly between lines 56 and 86. When the diverter is rotated by 90 degrees the heater 60 is included in the circuit. Similarly, the diverter of valve 74 is positioned to bypass the solar collector 62. Rotation of the diverter 90 degrees will result in inclusion of the solar collector in the circuit.

The four-way valve 78 has one of its ports connected to line 58. Another port is connected by line 92 to one of the ports of a three-port valve 94. A third port of valve 78 is connected by line 96 to deliver water to the input of pump 66 through the manually operated valve 98. The fourth port of valve 78 is connected by a line 100 to a second three-port valve 102.

The valve 78 is a reversing valve. When its diverter is in the position shown, water is circulated in the pool and in the spa by withdrawing water from the bottom of the pool by line 104 or the bottom of the spa by line 106, and returning that water to an upper point in the pool 68, by line 108 or to an upper point in the spa 70, by line 110. The two three-port valves, 94 and 102, are operated in unison. When their diverters are in the position shown, it is the water in the pool that is circulated rather than the water in the spa. When the position of the diverters of those valves 94 and 102 are changed, line 106 is connected to line 100 and line 110 is connected to line 92. Lines 104 and 108 are closed at valves 102 and 94, respectively, when the position of the diverters of those valves is changed. In that circumstance, water is removed from the bottom of the spa 70 by line 106, and it flows through valves 102, line 100, line 96, and valve 98 to the pump 66. The discharge from the pump flows through the filter 64, line 84, valve 74, line 86, valve 76, line 56, heat pump 46, line 58, valve 78, line 92, valve 94, and line 110 to a three-port valve 112 from whence it flows by line 116 to the center portion of the spa joined by an air line 118, or, when the diverter of valve 112 is placed in the opposite position, it flows by line 114 back to the pump intake 66. Air from blower 72 flows through valve 120, when the valve diverter position is changed, to line 118 where it is combined with the water flow from line 116. The line 118 discharges at a mid-level in the spa 70.

In addition, the system includes a line 122 which extends from the skimmer of the pool through a valve 124 to the input side of pump 66. A conventional fill line 126 extends from a lower point in the spa 70 through valve 128 to a junction with line 58.

Finally, it is a characteristic of water source heat pumps, and of the heat pump 46, that superheat is available for heating the water in a separate hot water reservoir. The system in FIG. 1 includes such a separate hot water heater reservoir 130 which is shown to be connected to the heat pump through a valve 132. To avoid excessive complexity, the source of water for that reservoir and the discharge line for hot water are not shown. One or both of those lines will include valves that are under the control of the valve controller 40.

That valve control 40 responds to temperature and pressure and sunlight sensors. The system includes a number of such sensors. Sensor 140 provides an indication of the temperature in the attic. Sensor 142 measures temperature in the confined space, or within the dwelling, 10. Sensor 144 measures ambient air temperature and the sunlight detector 146 indicates when the daylight exceeds some selected level. Sensor 148 measures air temperature in an outside conduit. Temperature sensor 150 measures temperature of hot water in reservoir 130. Sensor 152 measures the temperature of the water in the pool 68, and the temperature sensor 154 measures the temperature of the water in lines 56 and 58. Temperature sensor 156 measures the temperature of the solar collector, and sensor 158 measures both pressure and temperature at the output of the pump. Sensor 159 measures below ground temperature. These several sensors have their outputs applied to the valve control 40 which, in the preferred arrangement, adjusts the several valves automatically according to some predefined plan. Valve 124 closes when valves 94 and 102 change to spa flow. Valve 128 operates in unison with valves 78 and 112 and 120. Also, valves 94 and 102 are operated together. The valve actuators and the control lines for those actuators have been omitted for the sake of clarity.

The system being thus arranged, the water in the pool, and the water in the spa, serve as a reservoir for thermal energy, in addition to serving as a recreation installation. The manner in which the pool and spa are plumbed differs in a number of important respects from what is conventional. In particular, the system is arranged for inclusion of a solar water heater which may be operated in lieu of, or together with, one or both of a conventional heater 60 and the water source heat pump 46. The water source heat pump itself is not conventional in pool and spa systems, and this system includes the feature that the fluid side of the heat pump 46 is isolated in its heat exchanger from the water that circulates through the pool and spa system to permit different volumetric rates and temperature levels. In addition, the use of the reversing valve 78 for reversing the direction of water circulation through the pool differs from the conventional. So, too, does the provision for reversing flow direction in the spa. The ability to reverse direction contributes greatly to the efficiency with which water temperature changes in the pool and spa can be accomplished. They contribute greatly to the speed and efficiency with which pool and spa water can be heated, and they contribute greatly to the speed and efficiency with which heat may be removed from the pool and the spa for transfer to the building 10.

The lines 42 and 44 that extend between the air flow control unit 20 and the heat pump 46 are air flow conduits. Conduit 44 is used to move air from the control unit to the heat pump, and the conduit 42 returns air from the heat pump to the air flow control unit 20. That air flow control unit may have a variety of forms within the invention. In the preferred form, it comprises two air flow control modules. Each module includes two air diverter valves which, in preferred form, are butterfly valves of the kind shown in FIG. 2. One of the two modules includes a blower fan. The two modules can be used in a variety of ways which, for the sake of clarity, are depicted in separate schematic showings in FIGS. 5 through 13. The valves are reversing or bypassing valves in that they are multiple port devices, and they include a valve element in the form of a diverter for which the common name is "damper" or "butterfly." Each valve is formed with four ports. In one position of the diverter or damper, flow is permitted between the first and second port and between the third and fourth port. In the other position of the diverter or damper, flow is permitted between the first and third and the second and fourth ports.

The basic and preferred valve structure is shown in FIG. 2. The valve housing is formed by two end plates 200 and 202 which are spaced and lie in parallel planes. Those end plates can be thought of as "plus sign" crosses which are bridged by V-shaped members one fitted into each of the four corner notches of the cross. They can be described in more functional terms as comprising spaced, rectangular end plates arranged in juxtaposition the opposing corners of which are interconnected by interconnecting members. The diverter is mounted for rotation on an axis that extends perpendicular to the end plates and through their respective center points. The diverter is formed as a rectangular plate carried on a central pivot that lies on the rotational axis. The diverter has a width corresponding to the separation of the internal surfaces of the end plates and width that extends between diagonal interconnecting members. The end plates are square and the separation between the plates corresponds to the length of one side of the square so that the space defined by the end plates and interconnecting members comprises a regular cube. There are four ports, one at each of the four sides of the cubicle space intermediate to end plates. An interconnecting structure surrounds each of the ports, and that interconnecting structure is square in cross-section, and it is the same in the case of each of the ports. The two side walls of the interconnecting structure are formed as extensions from the square side plates, whereas the sides of the interconnecting structure in between the end plates are formed as extensions of the corner interconnecting members.

For identification, the flow diverter or damper of the valve in FIG. 2 is numbered 204. It is mounted on a pivot shaft or rod 206 which extends through bearings, not visible in the drawing, at the very center of end plates 202 and 200. The end plate 202 can be thought of as comprising a square central region with sideward extensions 208, 210, 212 and 214. Each of the extensions is as wide as the central square is wide. Two of the extensions of the end plate 200 are visible, and they are numbered 216 and 218, respectively. Each juxtaposed pair of those extensions, for example the pair 218 and 216, and the pair 210 and 218, form the sides of a four-sided interconnecting element by which square air flow conduits may be interconnected with the valve structure. In FIG. 2, the extensions 216 and 208 are interconnected at their upper side by a connector wall 220 and at their lower side by interconnector wall 222. The wall 220 is one side of a V-shaped member 224 whose other side 226 serves as the interconnecing wall that extends from coupler extension 210 to coupler extension 218. The coupler member at the top is completed by the fourth side 228. That portion of the V-shaped member 224 which forms its apex is the interconnecting member referred to above that interconnects the juxtaposed corners of the central square region of the end plates.

The valve structure of FIG. 2 is included in the module shown in FIGS. 3 and 4. In FIG. 3, the shaft or rod 206 on which the damper 204 is mounted extends beyond the end plate a greater distance at end plate 200 than it does at end plate 202. An actuating mechanism, not shown here, is connected to the extension of the rod. That is true also of the rod 230 of the other valve 232 which forms part of the module. The rod extends beyond the end plate 234 in greater degree than it does beyond the end plate 236 for connection to an actuator for its damper or butterfly 238. The valve 232 is just like the other valve, the one shown in FIG. 2. However, in the module it is oriented so that its operating shaft or rod 230 extends perpendicularly to the operating shaft or rod 206 of the other valve. The two actuating shafts are disposed in parallel planes so that one of the ports, rather than the end plate of the valve 232, faces one of the ports of the other valve which, for identification, has been numbered 235.

Not only does one port of valve 232 face one port of valve 235, but those two valves are interconnected by a flow passage section 237 which, in this module, contains a blower 239 for propelling air from one valve toward the other. The interconnecting section is arranged so that it need simply be rotated by 180 degrees before installation to reverse the direction in which air is made to flow by the fan. That port that lies directly opposite the port of valve 235 which is connected to the interconnecting section 237 is connected to a flow conduit 240 which is generally L-shaped and whose other end is connected to one of ports of valve 232 which lies adjacent to the port to which the interconnection section 237 is connected. In FIG. 3, the interconnecting conduit is connected from the port at the right side of valve 235 to the port at the bottom of valve 232. It matters not whether the interconnecting member is connected from the right end of valve 235 to the bottom or the top port of valve 232 except that the extension of the operating shafts of the two valves must remain exposed for a connection to their respective actuators.

Because the ports of the two valves are square and each port is like each of the others that there is no need for any special orientation of the valve in creating a valve module. That is one of the advantages of the invention in a complete installation of the kind depicted in FIG. 13 and indicated in FIG. 1. There are two valve modules which may be identical except that it is not necessary to include the blower or fan in the interconnecting section of one of them, and ordinarily that fan would be omitted.

Figure 8:
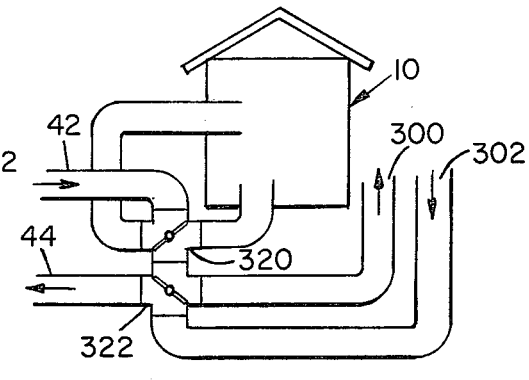
Figure 9:
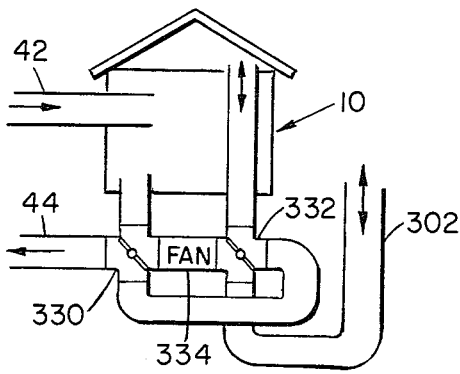

The manner in which the valve modules and valves are employed is depicted in FIGS. 5 through 13. In these several figures, the duct work that is not employed is not shown in the figure. Since the duct work that extends to the attic is shown only in FIGS. 9 and 11 through 13, the transparent overroof is shown only in those figures. In the case of each of FIGS. 5 through 13, the two air ducts which extend to the left correspond to air ducts 42 and 44 of FIG. 1. In each case the dwelling 10 is provided with a high flow outlet 28 and a low flow outlet 26. In the case of FIGS. 6, 7, 8, 10, 12 and 13, there is an outlet duct 300 and in inlet duct 302 by which air may be expelled to the ambient atmosphere or received from the ambient atmosphere, respectively. In FIG. 9 there is an exterior flow outlet duct 302 but no exterior flow inlet other than the attic. In the case of FIGS. 9, 11, 12 and 13 the role of the inlet and outlet ducts can be reversed using the valves of the air flow control system.

Figure 5:
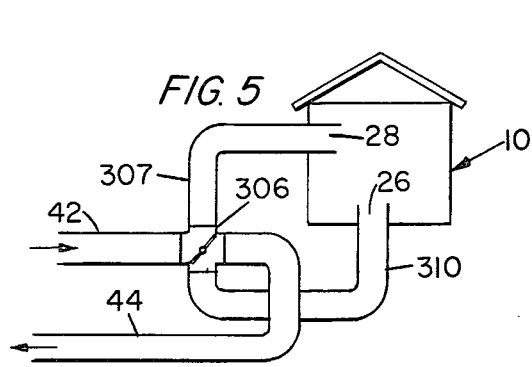
FIGS. 5 through 13 are diagrams showing how the reversing or bypass air diverter valves and air diverter valve modules of the invention are employed in controlling the flow of air between a heat pump and a dwelling and the outdoors.

In FIG. 5, only one of the valves is used. If included, the other elements of the modules are simply not used. In FIG. 5, the valve is numbered 306 and its diverter is arranged so that the flow of air proceeds from inlet conduit 42 through the valve 306 to the interior of the building via conduit 307 and flow opening 28. Return flow proceeds from flow opening 26 through conduit 310 and the other side of valve 306 to the outlet conduit 44. The valve 306 is shown with its diverter in the cooling position. When the task is to heat the house, the diverter position is changed so that inlet air flows to the building from conduit 42 through the valve 306 and conduit 310 to flow opening 26. The return flow proceeds through flow opening 28 and conduit 307, valve 306 and return conduit 44. FIG. 5 simply depicts use of the valve 306 to optimize the flow through the building during heating and cooling. The valve 306 is used as a reversing valve.

Figure 6:
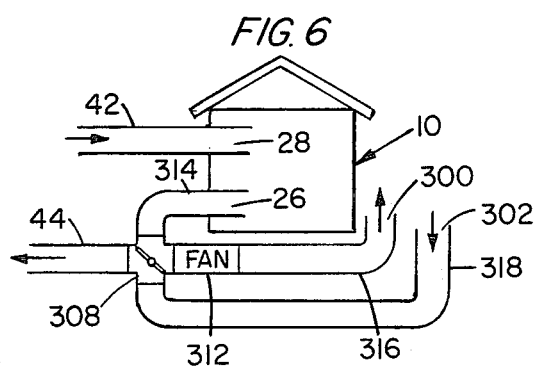
Figure 7:
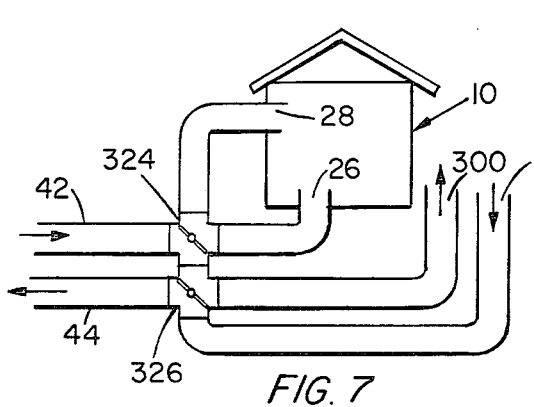

FIG. 6 depicts the system as it would be used in a different circumstance. Here, the valve 308 is used together with the fan 312. In this case, cooling air is transported by the flow conduit 42 to the flow opening 28. Return flow enters flow opening 26 and flows by conduit 314, valve 308, fan 312, and conduit 316 to the outdoor exhaust flow opening 300. Return air to the heat pump, or other energy exchange unit, flows from the outside flow opening 302 by conduit 318 and valve 308 to the return conduit 44. This arrangement is useful when attempting to cool the interior of the building at a time when the exterior air temperature is lower than the indoor temperature. If the converse is true, if the interior temperature is less than the outdoor temperature, the diverter of valve 308 is changed so that flow proceeds into the room via conduit 42 and flow opening 28 and return flow passes through flow opening 26 and line 314 and valve 308 directly to the return line 44. When outdoor air is warmer than indoor air, this system can be used to increase heating efficiency.

The valve 320 in FIG. 8 is used in the same manner as is valve 306 of FIG. 5. It interconnects two circuits and permits flow reversal in one. The other valve 322 of FIG. 8 performs the same task as does valve 308 in FIG. 6. It is connected between two circuits and is used to open or bypass (extend or not extend) the first circuit through the second selectively. The figures of both valves 324 and 326 are used as selectively open or bypass valves like valves 308 and 322. The difference between the two kinds of uses is determined by how the valve ports are connected to the two circuits that interface at the valve. If each of the two circuits enters and leaves the valve at opposite ports, the function performed is reversal. If each of the two circuits enters and leaves the valve at adjacent ports, the function performed is selectively open or bypass. The two valve connection configurations permit optimizing heating and cooling flow direction, excluding exterior air flow from the heating and cooling circuit; discharging air from the dwelling to the exterior while replacing dwelling air with outside air; performing that latter function with reversal flow within the dwelling; and, in FIG. 7, excluding the dwelling from the circuit as when heat is to be transferred from outside air, through the heat pump to the liquid sink.

In FIG. 9, there is no valve to reverse flow of air in the dwelling. Valve 330 is used as a selective open or bypass valve, and valve 332 is a reversing valve. In one position of the diverter of valve 332, flow in the extended circuit is exhausted to the outside below ground level and return air is taken from the attic. Flow is reversed when the diverter is reversed. The heat pump blower, not shown, is aided by the blower fan 334. Together fan 334 and valves 330 and 332 form a module like the module shown in FIGS. 3 and 4.

Figure 10:
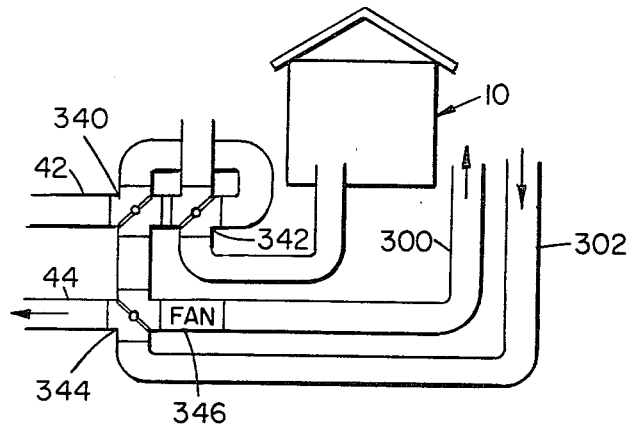

In FIG. 10, valve 340 is an open or bypass valve by which to include or not include flow in the dwelling 10. If the dwelling circuit is included by positioning the diverter of valve 340 as shown, then the reversing valve 342 will determine the flow direction by the position of its diverter. The open or bypass valve 344 is used to determine whether the exterior circuit is to be included or bypassed.

Figure 11:
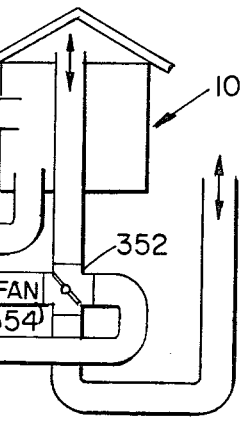
Figure 12:
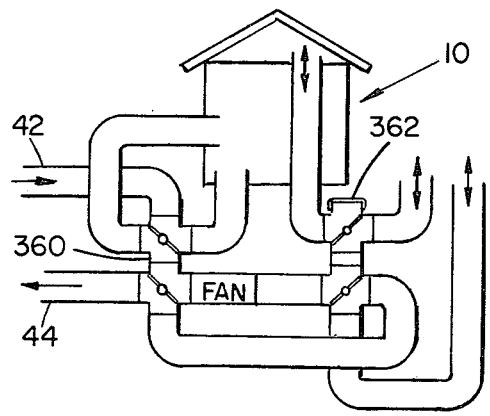

FIG. 11, the module formed by valves 350 and 352 and fan 354 performs the same function as does the module which includes valves 330 and 332 and fan 334 of FIG. 9. This installation includes another valve 356 in the open or bypass configuration. In FIG. 12, the open or bypass valve 356 is replaced with a reversing valve 360 and a modified valve 362 has been added. Like all the others, valve 362 can be, and in this case is, like the valve of FIG. 2, with one exception. One of its ports is blocked closed. That can be done by replacing one of the V-shaped cross-members with the structure shown in FIG. 16. The latter is a preferred closure which consists of a V-shaped part 362 which is integrally formed with a cover plate 364. When a valve having one port closed is connected as a reversing or bypass valve having only one port open to the primary circuit, the valve serves as an "or" valve for connecting the primary circuit to one side or the other of the secondary circuit. In this case, the diverter of the valve selects the attic flow path or the other ambient exterior flow path.

Figure 16:
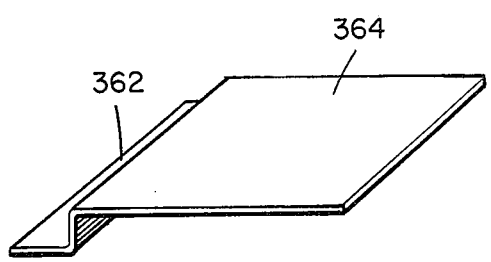
FIG. 16 is an isometric view of a cover member for use in closing a flow port in the valve of FIG. 2 or the module of FIGS. 3 and 4.

It will be apparent that the structures depicted in FIGS. 2 and 16 can be used to form a 2-port shut-off valve. Where uniformity has merit, this form is useful along with the three-port and four-port configurations.

Figure 13:
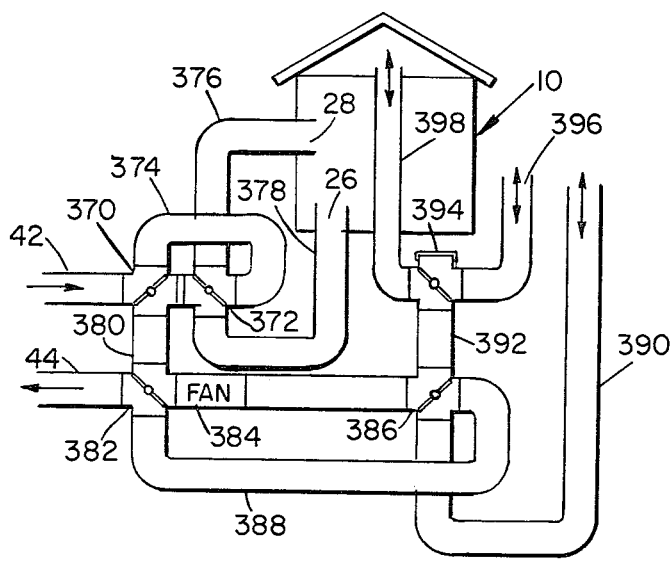

FIG. 13 shows the complete installation. The dwelling heating and cooling circuit includes open or bypass valve 370, reversing valve 372, valve to valve return conduit 374 which forms a module without fan with the two valves 370 and 372. The dwelling circuit also includes high duct 376, high opening 28, low opening 26, and low duct 378. The primary circuit extends from conduit 42 to valve 370 and then through conduit 380 to conduit 44 through valve 382. The latter is the "include or not include" valve of a module which includes fan 384 and reversing valve 386 and valve to valve return conduit 388. One secondary circuit port of valve 386 is connected by conduit 390 to exterior air. The opposite port is connected by conduit 392 to three way "or" valve 394.

The diverter of that valve selects outside conduit 396 or the attic conduit 398. Thus arranged, the system, when incorporated in FIG. 1, can be made to transfer heat from attic to dwelling house or to the pool water or other sink or source. It can be made to cool the dwelling and attic with outside air. It can be made to transfer heat or cool from sink or source to the dwelling or to transfer heat from outside air to the sink. The system can be configured in a variety of ways to take advantage of, or to overcome, difficulty occassioned by climatic and current weather conditions with no major change in materials or construction techniques, except the replacement of the conventional air conditioner and furnace.

Figure 15:
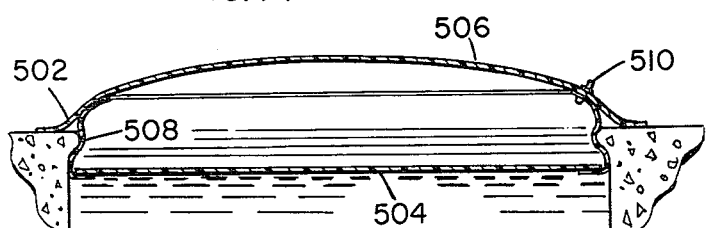
FIG. 15 is a cross-sectional view taken on line 15—15 of FIG. 14.

Returning to FIG. 1, the pool 68 is shown to be provided with a cover 500. That cover is shown in greater detail in FIGS. 14 and 15. FIG. 14 shows the top plan view of a cover made for a kidney shaped pool. The edge portion 502 is arranged so that it will lie on the deck immediately adjacent to the pool. As best shown in FIGS. 1 and 15, the pool cover comprises two layers. A lower layer 504 rests on the surface of the water, and the upper layer 506 is separated from the lower layer, although the two are joined. The lower layer is made of a material which will lie flat on the surface of the pool water.

The upper layer is formed of a material which permits it to assume a dome shape over the substantially flat under layer. That is shown both in FIG. 1 and in FIG. 15. A side wall 508 interconnects the upper and lower layers. Wall 508 serves to engage the elements of the pool structure between the water surface and the level of the deck that surrounds the pool when the space between layers 504 and 506 are inflated. Inflation is accomplished with the aid of an inflation valve 510.

Inflation causes the wall 508 to engage the upper side wall of the cover preventing the edges of the bottom layer 504 from being lifted from engagement with the water surface. However, the upper layer 506 is ballooned or domed upwardly. Rain water and melting snow run off to the skirt 502 and down onto the pool deck. The skirt slopes downwardly and outwardly from the upper margins of side wall 508. The cover is ordinarily employed only in those periods when the pool is not going to be used for recreational purposes. Because of its domed arrangement, it can be left on pools in cold climates. Any snow that accumulates on top will ultimately melt and run off. One of the advantages of this construction in all climates is that there is no heat loss by evaporation. In those pool covers that do not employ an air insulation layer, water collects on the pool cover and is itself evaporated so that the advantage of the cover is lost.

The layer 504 is black colored so that it will absorb heat. Layer 506 is transparent, at least to infrared light. Infrarays pass through the layer 506 and impinge upon layer 504 which is heated. That heat is transmitted by conduction to the water which is a good conductor of heat. The air in the space between the two layers is a poor conductor. As a consequence, a "green house" effect is created by which heat can flow into the body of water with ease, but flows out much less readily.

An effective solar energy collector, in which the captured energy is stored as heat, requires two elements in addition to the collector. There must be a storage sink for heat and a circulation system for moving the heat from the collector to the sink. In the conventional pool installation water can be removed from the bottom of the pool at the drain or from the top of the pool at the skimmer. The circulation system returns the water to the pool at or near the top. While the conventional system may remove cooler water from the pool bottom, it returns water to the top. The result is that the upper layer of water is cooled by the circulating water in some degree, but the temperature at the point where solar heating occurs is much less efficient than when, as in the invention, circulation in the pool is reversed to transfer the warmer upper water to the bottom of the pool where that heat, instead of merely rising to the top again, is mixed with cooler water. The combination of the pool cover with its "green house" effect, the pool water and reversed circulation in the pool constitute a very efficient solar energy collection system.

Although I have shown and described certain specific embodiments of my invention, I am fully aware that many modifications thereof are possible. My invention, therefore, is not to be restricted except insofar as is necessitated by the prior art.

I claim:

1. For transferring heat to and from a given place, in combination:

a heat pump of the kind that transfers heat to and from liquid at the source side and that transfers heat from and to air at the output side, each of the source side and output side including a flow inlet and a flow outlet;

means for connecting said heat pump to a liquid heat sump at its source side; and an air flow control system connected to said heat pump at its output side;

said air flow control system comprising a four-port air flow control valve and a primary flow path extending from the flow outlet at the output side of said heat pump through said valve to the flow inlet at the output side of said heat pump;

said air flow control system further comprising a secondary flow path in the form of first and second flow conduits each connected to a respectively associated port of said valve and each including means in the form of a flow opening for delivering air to said given place;

said valve including a flow diverter and being effective as a consequence of change in position of the diverter to selectively isolate the primary flow path from the secondary flow path or to include the secondary flow path in series with said primary flow path.

2. The invention defined in claim 1 in which said secondary flow path further comprises a secondary circuit four-port air flow control valve having two of its ports connected in series with said first flow conduit and the two others of its ports connected in series with said second flow conduit, said secondary circuit air flow control valve including a flow diverter movable between two positions such that flow in said secondary circuit is in one direction when the diverter is in one of said two positions and such that flow is reversed when the diverter is in the other of said two positions.

3. The invention defined in claim 2 which further comprises a blower connected in series with said primary flow circuit and one of said ports of the secondary circuit four-port air flow control valve which are connected in series with said primary flow circuit.

4. The invention defined in claim 1 which further comprises:

a second four-port air flow control valve having two of its ports connected in series with said primary flow circuit;

a secondary circuit comprising first and second flow conduits each connected to a respectively associated one of the ports of said second four-port air flow control valve and opening at a place different from said place first mentioned;

said second four-port air flow control valve including a flow diverter and being effective as a consequence of change in position of the diverter to selectively isolate the primary flow path from the second secndary flow path or to include said second secondary flow path in series with said primary flow path.

5. The invention defined in claim 4 which further comprises third and fourth secondary circuit four-port air flow control valves each having two of its ports connected in series with the first flow conduit of a respectively associated one of said first mentioned and said second four-port air flow control valves;

each of said third and fourth secondary circuit four-port valves having the other two of its ports connected in series with the second flow conduit of its respectively associated one of said first mentioned and said second four-port air flow control valves;

each of said third and fourth secondary circuit four-port air flow control valves including a flow diverter movable between two positions such that flow in the respectively associated secondary circuit is in one direction when the diverter is in one of said two positions and is in the opposite direction when the diverter is in the other of said two positions.

6. The invention defined in claim 5 which further comprises a blower connected in series with said primary flow circuit and one of its first mentioned two ports of said third secondary circuit four-port valves which are connected in series with said primary flow circuit.

7. For transferring heat to and from a given place, in combination:

a heat pump of the kind that transfers heat to and from liquid at the source side and that transfers heat from and to air at the output side, each of the source side and output side including a flow inlet and a flow outlet;

means for connecting said heat pump to a liquid heat reservoir at its source side; and an air flow control system connected to said heat pump at its output side;

said air flow control system comprising a four-port air flow control valve and a primary flow path extending from the flow outlet at the output side of said heat pump through said valve to the flow inlet at the output side of said pump;

said air flow control system further comprising a secondary flow path in the form of first and second flow conduits each connected to a respectively associated port of said valve and each including means in the form of a flow opening for delivering air to said given place;

said valve including a flow diverter movable between two positions and being effective, as a consequence of change in position of the diverter to reverse the direction of flow in said secondary circuit.

8. The invention defined in claim 7 which further comprises:

a second four-port air flow control valve having two of its ports connected in series with said primary flow circuit;

a secondary circuit comprising first and second flow conduits each connected to a respectively associated one of the ports of said second four-port air flow control valve and opening at a place different from said place first mentioned;

said second four-port air flow control valve including a flow diverter and being effective as a consequence of change in position of the diverter to selectively isolate the primary flow path from the second secondary flow path or to include said second secondary flow path in series with said primary flow path.

9. The invention defined in claim 8 which further comprises a third four-port air flow control valve having two of its ports connected in series with the first flow conduit that is connected to a port of the second four-port air flow control valve and having the other two of its ports connected in series with the second flow conduit that is connected to a port of the second four-port air flow control valve;

said third four-port air flow control valve including a flow diverter movable between two positions such that flow direction in the first and second flow circuits to which its ports are connected is reversed as a consequence of movement of the diverter from one of said two positions to the other.

* * * * *